(12) United States Patent
Okada

(10) Patent No.: US 8,248,526 B2
(45) Date of Patent: Aug. 21, 2012

(54) IMAGING MODULE

(75) Inventor: Hiroshi Okada, Setagaya-ku (JP)

(73) Assignee: Kyocera Corporation, Kyoto (JP)

(*) Notice: Subject to any disclaimer, the term of this patent is extended or adjusted under 35 U.S.C. 154(b) by 145 days.

(21) Appl. No.: 12/988,493

(22) PCT Filed: Apr. 10, 2009

(86) PCT No.: PCT/JP2009/057352
§ 371 (c)(1),
(2), (4) Date: Oct. 18, 2010

(87) PCT Pub. No.: WO2009/131017
PCT Pub. Date: Oct. 29, 2009

(65) Prior Publication Data
US 2011/0037893 A1    Feb. 17, 2011

(30) Foreign Application Priority Data

Apr. 24, 2008   (JP) ................. 2008-113483

(51) Int. Cl.
*H04N 5/225* (2006.01)
(52) U.S. Cl. ........................ 348/374; 359/819
(58) Field of Classification Search ............ 348/207.99, 348/340, 374; 359/363, 819; 439/331
See application file for complete search history.

(56) References Cited

U.S. PATENT DOCUMENTS

| | | | |
|---|---|---|---|
| 2004/0017501 A1* | 1/2004 | Asaga et al. | 348/340 |
| 2006/0103953 A1* | 5/2006 | Lee et al. | 359/819 |
| 2006/0181633 A1* | 8/2006 | Seo | 348/340 |
| 2007/0292124 A1 | 12/2007 | Gottwald | |
| 2008/0119080 A1* | 5/2008 | Wu | 439/331 |
| 2008/0252774 A1* | 10/2008 | Chen et al. | 348/374 |
| 2008/0291322 A1* | 11/2008 | Schick | 348/374 |
| 2009/0021635 A1* | 1/2009 | Cheng | 348/374 |
| 2009/0195897 A1* | 8/2009 | Tsai et al. | 359/819 |

FOREIGN PATENT DOCUMENTS

| | | |
|---|---|---|
| JP | 2001-320036 A | 11/2001 |
| JP | 2004-272196 A | 9/2004 |
| JP | 2006-020014 A | 1/2006 |
| JP | 2006-519512 A | 8/2006 |
| JP | 2006-284628 A | 10/2006 |

OTHER PUBLICATIONS

International search report for corresponding international application No. PCT/JP2009/057352 lists the references above.

* cited by examiner

*Primary Examiner* — Nelson D. Hernández Hernández
*Assistant Examiner* — Dennis Hogue
(74) *Attorney, Agent, or Firm* — DLA Piper LLP (US)

(57) ABSTRACT

An imaging module includes an imaging substrate mounting an imaging device thereon, a resin holder including a substrate securing portion to which the imaging substrate is secured, a lens support barrel supporting a lens at an inside thereof, and a holding portion which protrudes toward a subject from the substrate securing portion and includes a through hole configured to permit retention of the holder in an external structure, a metal securing member disposed at a side of the substrate securing portion of the holder facing a subject, and a metal holding plate including a securing region which is secured to and electrically connected to the securing member, and a holding portion adjacent region which overlaps a part around the through hole of the holding portion and includes a through hole configured to communicate with the through hole.

3 Claims, 2 Drawing Sheets

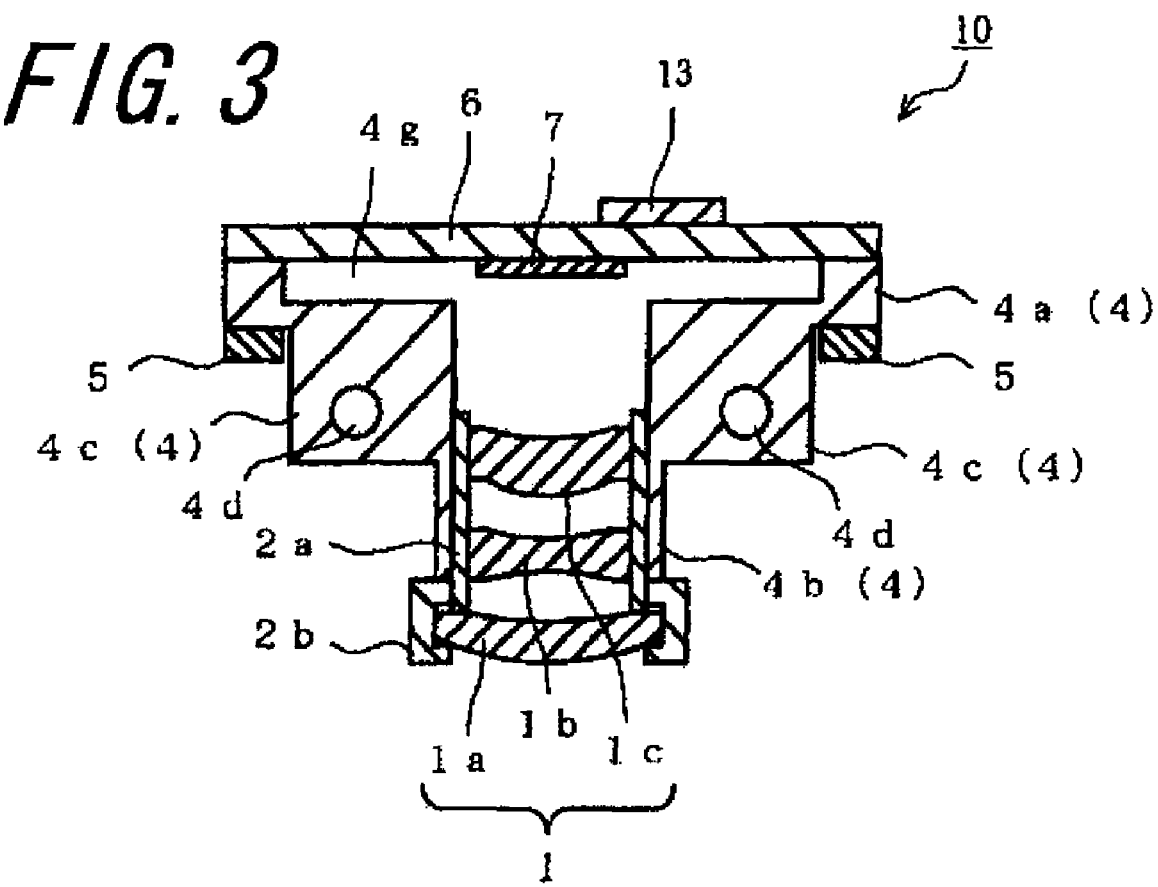

IMAGING MODULE

CROSS-REFERENCE TO THE RELATED APPLICATIONS

This application is a national stage of international application No. PCT/JP2009/057352, filed on Apr. 10, 2009, and claims the benefit of priority under 35 USC 119 to Japanese Patent Application No. 2008-113483, filed on 24 Apr. 2008, the entire contents of which are incorporated herein by reference.

TECHNICAL FIELD

The present invention relates to an imaging module which employs an imaging device such as a semiconductor image sensor.

BACKGROUND ART

For example, in Patent literature 1, there is disclosed, as a compact imaging module, an imaging module which employs a semiconductor image sensor such as a CCD image sensor and a CMOS image sensor as an imaging device for converting light from a subject into an electric signal, and comprises an imaging substrate having the imaging device mounted thereon and a metal holder comprising a lens support barrel configured to support a lens for condensing subject light.

Moreover, in the imaging module described in Patent literature 1, the imaging substrate and the holder are fastened to each other by screws. More specifically, a through hole for screw insertion is formed in the imaging substrate, and a screw retaining hole is formed in the holder. A screw is inserted into the through hole of the imaging substrate from a side opposite the side of a subject, and is subsequently put in the screw retaining hole of the holder, so that the imaging substrate can be clamped by the holder and the head of the screw to be fastened to the holder.

Further, the holder comprises a through hole which differs from the screw retaining hole. A support pin or the like is inserted into this through hole to permit retention of the holder in an external structure such as a protective case.

It is noted that a printed circuit substrate made of a resin material such as epoxy resin capable of withstanding screw-fastening operation is used as the imaging substrate.

CITATION LIST

Patent Literature

Patent literature 1: Japanese Unexamined Patent Publication JP-A 2004-272196

DISCLOSURE OF INVENTION

Technical Problem

In recent years, imaging modules have been put to use with growing frequency for vehicle-mounted cameras to be mounted in motor vehicles. For example, imaging modules find applications in vehicle-mounted cameras including a sensor camera for recognizing white lines ahead of a motor vehicle and an imaging camera for displaying situations behind a motor vehicle. In expectation of increasing placement of vehicle-mounted cameras in motor vehicles in the years ahead, for the purpose of making motor vehicles lighter in weight, weight reduction, even by the gram, has come to be demanded of vehicle-mounted cameras.

However, the foregoing imaging module poses the following problems. Since the holder, which is largest in size among the components constituting the imaging module, is made of metal, there are limitations to the extent of weight reduction.

In that regard, if the holder is simply made of resin, its through hole, into which is inserted a support pin to permit retention of the holder in an external structure such as a protective case, will be likely to undergo deformation, with consequent lack of stability in the retention of the holder in the external structure. Furthermore, in this case, it is impossible to benefit from the effect of shielding against electromagnetic wave noise from a subject side, which is one of the features of the metal holder. As a result, images of high resolution cannot be acquired.

The invention has been devised to solve the foregoing problems associated with the conventional art, and accordingly its object is to provide an imaging module that can be made lighter in weight, can be retained in an external structure with stability, and allows acquisition of high-resolution images.

Solution to Problem

The invention provides an imaging module comprising: an imaging substrate mounting an imaging device on one surface thereof, the imaging device being configured to convert subject light into an electric signal; a resin holder comprising a substrate securing portion which covers the one surface of the imaging substrate and is configured to secure an outer periphery of the one surface, a lens support barrel which is formed integrally with the substrate securing portion, and is configured to support a lens for condensing the subject light into the imaging device at an inside thereof, and a holding portion which protrudes toward a subject from the substrate securing portion and comprises a through hole configured to permit retention of the resin holder in an external structure; a metal securing member which is disposed at a side of the substrate securing portion of the resin holder facing a subject, and is configured to sandwich the substrate securing portion with the imaging substrate; and a metal holding plate comprising a securing region which is secured to the metal securing member and electrically connected to the metal securing member, and a holding portion adjacent region which overlaps a part around the through hole of the holding portion in the resin holder and comprises another through hole configured to communicate with the through hole.

Moreover, in the imaging module of the invention, it is preferable that a projection is formed near the through hole of the holding portion of the resin holder, and the projection is fitted into an opening formed near the another through hole of the holding portion adjacent region of the metal holding plate.

Moreover, in the imaging module of the invention, it is preferable that the imaging substrate comprises a plurality of through holes, and a ground electrode attached to the other surface thereof, and screws are inserted into the plurality of through holes from the other surface of the imaging substrate, respectively, wherein heads of the screws are kept in contact with the ground electrode, and tips of the screws are retained in screw holes formed in the metal securing member, respectively.

Advantageous Effects of Invention

According to the imaging module of the invention, a resin holder is used, and the metal securing member is disposed at a side of the substrate securing portion of the resin holder facing a subject and is configured to sandwich the substrate securing portion with the imaging substrate. Therefore, the metal securing member is only required to have an area conforming to at least the size of the substrate securing portion of the resin holder. This makes it possible to reduce the amount of metal materials to be used and thereby achieve weight reduction. Moreover, a metal holding plate is used, and the metal holding plate comprises a securing region which is secured to the metal securing member and electrically connected to the metal securing member. Further, the holding portion adjacent region of the holding plate, which overlaps a part around a through hole formed in the holding portion of the resin holder, comprises another through hole configured to communicate with the through hole of the holding portion of the resin holder. In this construction, the resin holder can be retained in an external structure with stability simply by inserting a support pin or the like into the through hole of the holding portion of the resin holder. Since the metal securing member affords the effect of shielding against electromagnetic wave noise from a subject side, it is possible to render the imaging module capable of acquiring images of high resolution.

Moreover, according to the imaging module of the invention, a projection is formed near the through hole of the holding portion of the resin holder. When the projection is fitted into an opening formed near the another through hole of the holding portion adjacent region of the metal holding plate, then the holding portion adjacent region of the metal holding plate and the part around the through hole of the holding portion in the resin holder become able to resist misalignment when overlapping each other. Therefore, a support pin or the like can be inserted easily into the through hole of the holding portion of the resin holder and the another through hole of the holding portion adjacent region of the metal holding plate. This helps facilitate the retention of the imaging module in the external structure.

Further, according to the imaging module of the invention, the imaging substrate comprises a plurality of through holes, and a ground electrode attached to the other surface thereof. When screws are inserted into the plurality of through holes from the other surface of the imaging substrate, respectively, wherein heads of the screws are kept in contact with the ground electrode, and tips of the screws are retained at the screw holes formed in the metal securing member, respectively, then the ground electrode of the imaging substrate is electrically connected to the holding plate through the screws and the securing member. Accordingly, when the external structure for holding the imaging module stands at ground potential, then the metal holding plate, the securing member, the screws, and the ground electrode of the imaging substrate can be brought into a condition of stability in terms of ground potential through a support pin or the like.

BRIEF DESCRIPTION OF DRAWINGS

FIG. 3 is a sectional view of the camera module taken along the line A-A indicated by arrows in FIG. 1.

DESCRIPTION OF EMBODIMENTS

Hereinafter, an imaging module of the invention will be described in detail with reference to the accompanying drawings. It is noted that, in the following description, the side of the imaging module opposite a subject will be referred to as the "back side".

Figure 1:
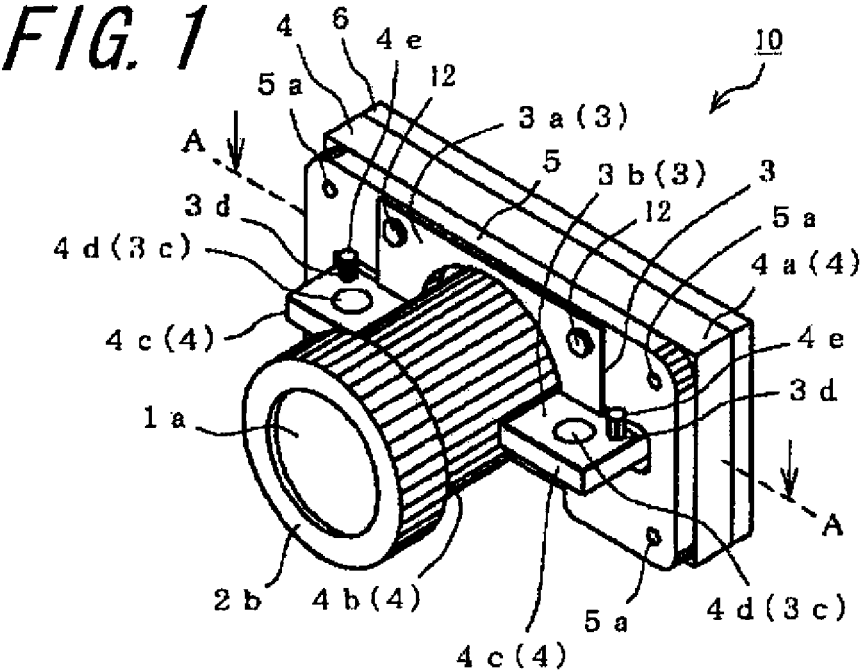
FIG. 1 is an external perspective view of a camera module which is an example of embodiments of the imaging module of the invention, as seen from a subject.
Figure 2:
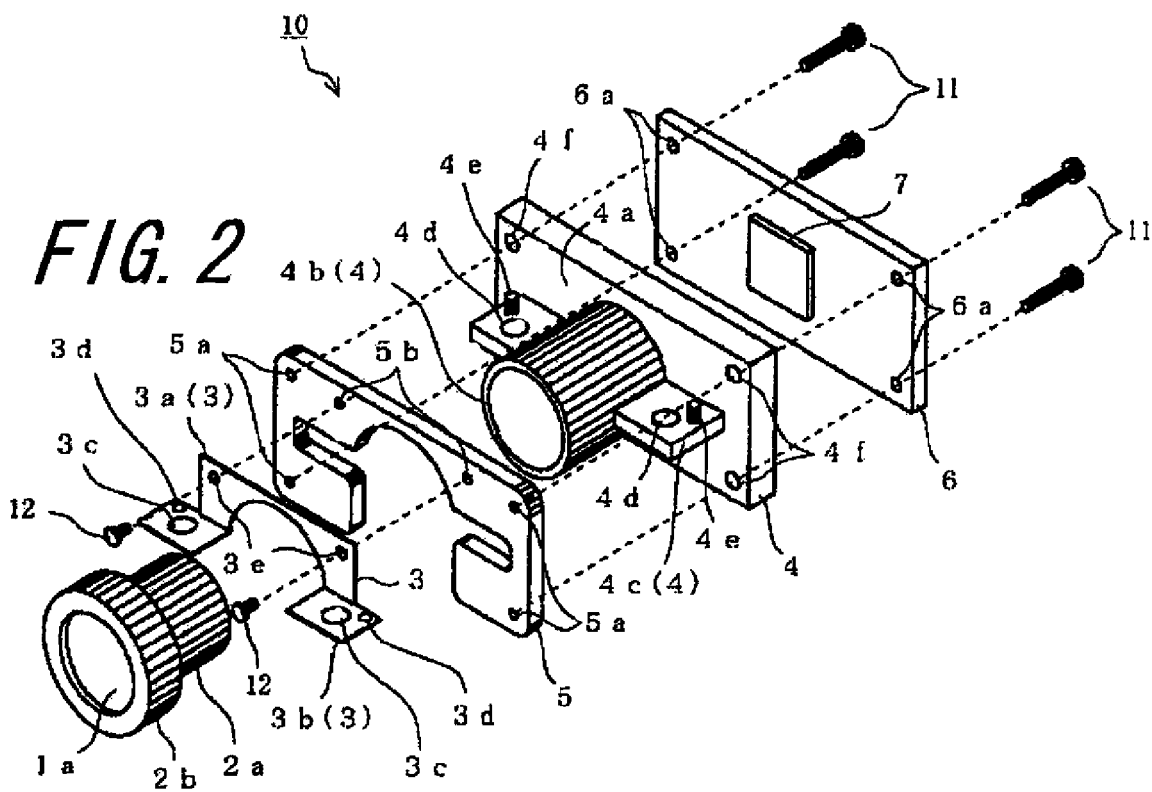
FIG. 2 is an exploded perspective view of the camera module shown in FIG. 1.

FIG. 1 is an external perspective view of a camera module which is an example of embodiments of the imaging module of the invention, as seen from a subject. FIG. 2 is an exploded perspective view of the camera module shown in FIG. 1. FIG. 3 is a sectional view of the camera module taken along the line A-A indicated by arrows in FIG. 1. The camera module 10 shown in those figures is basically comprises an imaging substrate 6, a holder 4, a securing member 5, a holding plate 3, and so forth.

Such a camera module 10 is designed for use as for example a vehicle-mounted camera module 10, and has the capability of taking images of white lines on a road or images of blind spots of a driver who drives a vehicle, and is operated under the control of an ECU (Electronic Control Unit) (not shown) for exercising vehicle travel control. It is noted that an electric signal outputted from the camera module 10 is converted into an image signal by the ECU so as to be shown on a display (not shown) placed forward of a driver's seat.

The imaging substrate 6 is a substrate having an imaging device 7 for converting subject light into an electric signal mounted on one of the main surfaces thereof (the main surface thereof situated toward a subject). For example, the imaging substrate is constructed of a printed wiring substrate formed by adding a glass filler to epoxy resin, a printed wiring substrate formed by impregnating a glass cloth with epoxy resin, or the like. An example of methods for constructing a printed wiring substrate will be described below.

To begin with, glass fibers made of alkali-free glass, quartz glass, or the like are woven into a glass cloth with the aid of an agent added with a resin binder, such as a sizing agent or a bundling agent, for protection of the glass fibers.

Next, the glass cloth is subjected to a water-washing treatment or heating treatment to remove the binder therefrom.

Next, as a coupling treatment to impart wettability and adherability with resin to the surface of the glass cloth, the binder-free glass cloth is immersed in a solution containing a silane coupling agent or the like and is whereafter dried.

Next, the coupling-treated glass cloth is impregnated with thermosetting resin to form a prepreg as an insulating layer.

Next, the surface of the prepreg formed as an insulating layer is coated with copper foil and is subjected to etching to form a wiring conductor in a predetermined pattern.

Next, a plurality of the prepregs provided with the wiring conductor are stacked and bonded together under pressure, with an adhesive made of thermosetting resin interposed therebetween, and the thermosetting resin is cured with heat. In this way, there is formed a multilayer substrate comprising a stack of a plurality of alternate insulating layers and wiring conductors.

Next, a through hole is formed by a drill so as to pass all the way through from the obverse side to the reverse side of the multilayer substrate.

After that, the inner surface of the through hole is plated with copper to form a through hole conductor for providing electrical connection between an upper-located wiring conductor and a lower-located wiring conductor. In this way, a printed wiring substrate is fabricated.

The imaging device 7 mounted on the imaging substrate 6 is constructed by placing a semiconductor image sensor such as a CCD image sensor or a CMOS image sensor in a semiconductor package. The semiconductor package is a highly airtight packaging member such for example as a ceramic wiring substrate composed predominantly of alumina. The semiconductor image sensor is housed in a cavity (not shown)

formed at a subject-side part of the semiconductor package. It is noted that the cavity is sealed with a light-transmissible lid (not shown) made of glass or the like material. Moreover, a plurality of terminals (not shown) extend from a lateral surface or a lower surface of the semiconductor package. The imaging device 7 is designed to be electrically connected, through those terminals, to the imaging substrate 6 and fixed in place by means of a coupling material such as solder. It is preferable that the amounts of the glass cloth and the glass filler used for the imaging substrate 6 are so determined that the thermal expansion coefficient of the semiconductor package can be equal to the thermal expansion coefficient of the imaging substrate 6 in order to reduce a thermal stress developed between the imaging substrate and the semiconductor package.

Moreover, on the surface and in the interior of the imaging substrate 6, there are formed a ground line for earthing (not shown) and a wiring conductor (not shown) which permits electrical connection with the terminals of the semiconductor package and the terminals of another mounted component, or to which are fixed those terminals. Such wiring conductor and ground line are formed on the surface and in the interior of the printed wiring substrate constituting the imaging substrate 6 by means of a plating technique when using a metal such as copper and gold as a material for the wiring conductor and ground line, a technique of bonding metal foil formed in a predetermined wiring pattern, a technique of removing unnecessary portions from the substrate wholly coated with metal foil by etching, or otherwise.

Such an imaging substrate 6 is fabricated as follows. For example, there is prepared a commercially available copper-coated substrate which is a substrate whose obverse and reverse surfaces are entirely covered with copper foil. This substrate is cut in desired dimensions, and the copper foil laminated on the surface thereof is etched in a desired wiring pattern with use of an acidic solution such as a diluted hydrochloric acid solution. It is noted that a through hole may be made therein by means of a laser, a drill, or otherwise on an as needed basis. By charging a metal paste into this through hole, it is possible to form a through conductor in a buried state and thereby provide electrical connection between the wiring pattern on the obverse side and the wiring pattern on the reverse side of the substrate.

On the other main surface of the imaging substrate 6 at the back side, expressed differently, on the main surface of the imaging substrate 6 opposite the surface thereof where the imaging device 7 is disposed, there are mounted components including an IC for processing electric signals from the imaging device 7 and a connector 13 for connecting a distributing cable (not shown) for providing electrical connection between the wiring conductor of the imaging substrate 6 and the ECU (not shown).

Subject light is condensed into the imaging device 7 by a lens 1. In the camera module 10 of this example, the lens 1 is designed as a group of a plurality of lenses composed of a first lens 1a, one side of which facing a subject is convexly curved for gathering subject light at wide angles, and a second lens 1b and a third lens 1c for causing the light that passed through the first lens 1a to approximate a parallel ray of light. In the case where the lens 1 is composed of the foregoing three lenses, for example, the first lens 1a, the second lens 1b, and the third lens 1c are arranged side by side in the order presented, in a direction from a subject to the imaging device 7, so as to be in overlying relation with each other on an optical axis.

The lens 1 is pressed, from the subject side, against a stepped portion formed on an inner wall in the inner space of a lens barrel 2a and is fixed in place by a retainer 2b acting as a pressing jig. For example, the retainer 2b and the lens barrel 2a are formed by processing a plate-like member made of anodized aluminum with use of a mold under application of heat.

The holder 4 is a resin component basically composed of a substrate securing portion 4a, a lens support barrel 4b, and a holding portion 4c.

The substrate securing portion 4a covers one surface of the imaging substrate 6. The outer periphery of the one surface of the imaging substrate 6 is secured to the substrate securing portion 4a. Moreover, the substrate securing portion 4a is sandwiched for retention between the securing member 5 which will hereinafter be described and the imaging substrate 6.

The lens support barrel 4b is formed integrally with the substrate securing portion 4a, on one side of the substrate securing portion 4a facing a subject. The lens support barrel 4b has, over its inner wall, a thread groove (not shown). The thread groove engages with a thread groove formed over the outer wall of the lens barrel 2a, so that the lens 1 can be freely movable along a location on the optical axis with respect to the lens support barrel 4b. In this way, in the camera module 10 of this example, the lens 1 is supported indirectly on the interior of the lens support barrel 4b, with the lens barrel 2a interposed therebetween.

The holding portion 4c is so formed as to protrude from the substrate securing portion 4a toward a subject. The holding portion 4c comprises a through hole 4d configured to permit retention of the holder in an external structure such as a protective case. Moreover, the holding portion 4c is formed integrally with the substrate securing portion 4a and the lens support barrel 4b as well, with consequent enhancement of the strength of retention of the holder in the external structure.

Such a holder 4 is fabricated by means of injection molding, for example.

More specifically, there is prepared a mold for injection molding having a cavity conforming to the shape of the holder 4, and a raw material for production of the holder 4 is poured into the cavity and is solidified there. In this way, the holder 4 of a predetermined shape can be molded. As to the raw material for production of the holder 4, the use of a nonconductive resin material, such as polycarbonate (PC) or polyphthalamide (PPA), makes it possible to ensure the strength of required level, while achieving weight reduction.

The securing member 5 is a plate-like member which is placed on one side of the substrate securing portion 4a of the holder 4 facing a subject. The securing member 5 secures, in cooperation with the imaging substrate 6, the substrate securing portion 4a so that the substrate securing portion 4a is sandwiched in between the securing member 5 and the imaging substrate 6. For example, such a securing member 5 can be fabricated as follows: there is prepared a metal plate made of a metal material having high rigidity such as stainless steel, the vertical and horizontal dimensions of which are substantially identical with those of the imaging substrate 6, and this metal plate is cut away at its portions corresponding to the lens support barrel 4b and the holding portion 4c.

The imaging substrate 6, the holder 4, and the securing member 5 are fastened to one another by screws 11 that are passed through the imaging substrate 6 and the holder 4 and are then retained in the securing member 5.

More specifically, a through hole 6a is formed at each of the four corners of the imaging substrate 6 and similarly a through hole 4f is formed at each of the four corners of the holder 4 for insertion of the screws 11. In addition, at each of the four corners of the securing member 5 is formed a screw hole 5a where the tip of the screw 11 is put in and retained.

The tips of the four screws 11 are inserted, from the back side, viz., the other main surface of the imaging substrate 6, into their respective through holes 6a of the imaging substrate 6, and are subsequently inserted, from the back side of the holder 4, into their respective through holes 4f of the holder 4. The tips of the four screws 11 are then put threadedly in their respective screw holes 5a of the securing member 5, with the thread grooves of the screws 11 engaging with the thread grooves of the screw holes 5a. At the same time, the heads of the screws 11 are brought into abutment with the other main surface of the imaging substrate 6, whereupon the substrate securing portion 4a of the holder 4 is sandwiched in between the imaging substrate 6 and the securing member 5 so as to be temporarily fixed in place. It is noted that, in this temporary fixing operation, the screws 11 are not tightened completely so that the imaging substrate 6 is allowed to move, relative to the holder 4, in a direction of a plane perpendicular to a direction of incidence of subject light.

Under such a condition, relative positioning of the lens 1 and the imaging device 7 is effected. More specifically, the lens barrel 2a supporting the lens 1 is inserted into the lens support barrel 4b, and subsequently a subject for image adjustment is placed on the subject side and an adjustment distributing cable is connected to the connector 13. With the adjustment distributing cable connected to an image analyzing apparatus, the holder 4 is moved, relative to the imaging device 7, in the direction of the plane perpendicular to the direction of incidence of subject light while checking electric signals provided from the imaging device 7, so that the lens 1 can be positioned properly. Then, following the completion of re-tightening of the screws 11, the lens barrel 2a is moved relative to the imaging device 7 to adjust the distance between the lens 1 and the imaging device 7 properly. It is noted that, by setting the inside diameters of, respectively, the through holes 6a of the imaging substrate 6 and the through holes 4f of the holder 4, to be larger than normal in consideration for example of positional deviation which could occur when mounting the imaging device 7, it is possible to provide greater latitude in positioning and thereby facilitate the positioning operation. Moreover, following the completion of fastening of the imaging substrate 6, the holder 4, and the securing member 5, the adjustment distributing cable is disconnected from the connector 13.

The holding plate 3 includes a securing region 3a which is overlappingly secured to and electrically connected to the securing member 5, and a holding portion adjacent region 3b which is disposed perpendicularly to the securing region 3a, overlaps a part around the through hole 4d in the holding portion 4c and comprises a through hole 3c which communicates with the through hole 4d.

Such a holding plate 3 can be fabricated as follows: there is prepared a thin plate material made of metal such as stainless steel having a thickness of 0.05 mm to 1.0 mm, and this plate material is subjected to punching process in such a manner that its portions corresponding to the securing region 3a and the holding portion adjacent region 3b are left intact, and is whereafter folded at right angles along a line of boundary between the securing region 3a and the holding portion adjacent region 3b.

According to the camera module 10 of this example, the resin holder 4 is used, and this resin holder 4 is held securely by being sandwiched in between the metal securing member 5 disposed on the side of the substrate securing portion 4a of the holder 4 facing a subject and the imaging substrate 6. In this construction, since the securing member 5 is only required to have an area conforming to at least the size of the substrate securing portion 4a of the holder 4, it is possible to reduce the amount of metal materials to be used and thereby achieve weight reduction. Moreover, the metal holding plate 3 is used, and the holding plate 3 comprises a securing region 3a which is secured to and electrically connected to the securing member 5. Further, the holding portion adjacent region 3b, which overlaps the part around the through hole 4d formed in the holding portion 4c of the holder 4, comprises the through hole 3c configured to communicate with the through hole 4d of the holding portion 4c of the holder 4. Therefore, the holder 4 can be retained in an external structure such as a protective case with stability simply by inserting a support pin or the like into the through hole 4d of the holding portion 4c of the holder 4. Since the metal securing member 5 affords the effect of shielding against electromagnetic wave noise from the subject side, it is possible to render the imaging module 10 capable of acquiring images of high resolution.

Moreover, in a case where the support pin to be inserted into the through hole 4d is made of metal and the external structure for holding the camera module 10 stands at ground potential, the holding plate 3 and the securing member 5 can be maintained at ground potential. This makes it possible to enhance the effect of shielding against electromagnetic wave noise from the subject side by the metal securing member 5.

In securing the holding plate 3 to the securing member 5, a screw hole 5b is formed at each of two locations of the securing member 5 in the vicinity of the lens support barrel 4b, and also a through hole 3e is formed at each of two locations of the holding plate 3 corresponding to the screw holes 5b of the securing member 5. Next, the tips of two screws 12 are inserted, from the subject side, into their respective through holes 3e of the holding plate 3, and subsequently the screws 12 are put threadedly in their respective screw holes 5b of the securing member 5, with their thread grooves engaging with the thread grooves of the screw holes 5b. Then, the heads of the screws 12 are brought into abutment with the securing region 3a of the holding plate 3, whereupon the holding plate 3 can be secured to and electrically connected to the securing member 5.

At this time, in the camera module 10 of this example, a projection 4e is formed near the through hole 4d of the holding portion 4c of the holder 4, and the projection 4e is fitted into an opening 3d formed near the through hole 3c of the holding portion adjacent region 3b of the holding plate 3. In this way, the holding portion adjacent region 3b of the holding plate 3 and the part around the through hole 4d of the holding portion 4c in the holder 4 become able to resist misalignment when overlapping each other, and thus a support pin or the like can be inserted easily into the through hole 4d of the holding portion 4c of the holder 4 and the through hole 3c of the holding portion adjacent region 3b of the holding plate 3. This helps facilitate the retention of the camera module 10 in the external structure.

Moreover, in the camera module 10 of this example, as shown in FIG. 3, on the back side of the substrate securing portion 4a of the holder 4 is formed a recess 4g which is located inside that area of the substrate securing portion 4a which abuts against the outer periphery of one surface of the imaging substrate 6. The imaging device 7 is housed in a space constituted by the recess 4g, the lens support barrel 4b, and the imaging substrate 6. This eliminates the need to prepare an additional protective member for the protection of the imaging device 7, with consequent miniaturization of the camera module 10. In order to achieve such a configuration, the thickness of the substrate securing portion 4a of the holder 4 is set to be larger than the thickness of, out of the components mounted on the imaging substrate 6 including the imaging device 7, the one having the largest thickness, and the depth of the recess 4g is set to be large enough to accommodate the imaging device 7.

In this case, by charging an adhesive into the area of abutment between the substrate securing portion 4a of the holder 4 and the imaging substrate 6, it is possible to achieve a higher degree of airtightness in the space for accommodating the imaging device 7.

Moreover, in the camera module 10 of this example, the imaging substrate 6 comprises a plurality of through holes 6a, and has a ground electrode attached to the other surface thereof. The screw 11 is inserted, from the other surface of the imaging substrate 6, into each of the plurality of through holes 6a, and the heads of a plurality of the screws 11 make contact with the ground electrode. When the tips of a plurality of the screws 11 stays in the screw holes 5a formed in the securing member 5, then the ground electrode of the imaging substrate 6 is electrically connected to the holding plate 3 through the screws 11 and the securing member 5. Therefore, when the external structure for holding the camera module 10 stands at ground potential, then the holding plate 3, the securing member 5, the screws 11, and the ground electrode of the imaging substrate 6 are brought into a condition of stability in terms of ground potential through the support pin or the like, and it is possible to allow acquisition of high-resolution images.

Moreover, it is preferable that the securing member 5 has through holes formed at the four corners thereof, respectively, and that the through hole 4f of the holder 4 communicates with the through hole of the securing member 5 and the through hole 6a of the imaging substrate 6 as well, and has a partition (retention wall) formed interiorly thereof.

In this case, a support pin is inserted, from the side of the securing member 5 facing a subject, into the through hole of the securing member 5 and is then put in the through hole 4f of the holder 4 so as to be retained, at its tip, by the retention wall. In this state, the securing member 5 and the holder 4 are attached to each other by using solder or the like. Moreover, another support pin is inserted, from the back side of the imaging substrate 6, into the through hole 6a of the imaging substrate 6, and is then put in the through hole 4f of the holder 4 so as to be retained, at its tip, by the retention wall. In this state, the imaging substrate 6 and the holder 4 are attached to each other by using solder or the like.

Also in this case, the support pin inserted from the side of the securing member 5 facing a subject and the other support pin inserted from the back side of the imaging substrate 6 are separated by the partition within the through hole of the holder 4. That is, those support pins can be kept out of electrical contact with each other.

Accordingly, as described above, when the holding plate 3 and the securing member 5 are kept at ground potential by inserting the metal support pin into the through hole 4d and causing the external structure for holding the camera module 10 to stand at ground potential, by connecting the screw 11 making contact with the ground electrode of the imaging substrate 6 to another external structure, the holding plate 3 as well as the securing member 5 and the ground electrode of the imaging substrate 6 can be maintained at ground potential while being electrically independent of each other. As a result, it never occurs that an induction current, which is generated when the securing member 5 is subjected to electromagnetic wave noise from the subject side, passes through the ground electrode of the imaging substrate 6. This makes it possible to stabilize the ground potential of the ground electrode of the imaging substrate 6, and thereby acquire images of even higher resolution.

Moreover, even if the support pin is smaller in diameter than the screw, it can be held securely with a sufficiently high securing strength by using solder or the like. Besides, the support pin having a diameter smaller than the diameter of the screw is lighter in weight than the screw, with consequent reduction of the weight of the camera module 10. Further, the holder 4 can be moved relative to the imaging device 7, with the tip of the support pin retained by the partition within the through hole 4f of the holder 4. This makes it possible to provide greater latitude in moving the holder 4 for the positioning of the lens 1, and thereby facilitate the positioning operation.

Moreover, in the case of using a support pin for the mutual attachment of the imaging substrate 6 and the holder 4, the holder 4 and the imaging substrate 6 can be attached to each other as follows: the support pin is, at its one end, inserted into the through hole 6a of the imaging substrate 6, with the other end of the support pin protruding from the back side of the imaging substrate 6, and, in this state, solder or the like is poured into the through hole 6a to fit the support pin securely into the through hole 6a of the imaging substrate 6. In this case, for example, there is prepared a shield plate having through holes or notches formed at the four corners thereof, respectively, and each of the through holes or notches is set at the protruding other end of the support pin by using solder or the like. This helps reduce the influence of electromagnetic wave noise coming from the back side upon the imaging device 7. Moreover, in this case, there is no need to attach an additional shield body to the back side of the imaging substrate 6, with consequent reduction of the weight of the camera module 10.

Alternatively, a thread groove may be formed over the inner wall of the through hole 4f of the holder 4, so that the screw 11 inserted through the through hole 6a from the back side of the imaging substrate 6 can be retained by the thread groove. At this time, while the tip of the screw 11 stays inside the through hole 4f of the holder 4, another screw may be put threadedly into the screw hole 5a and the through hole 4f of the holder 4 from the side of the securing member 5 facing a subject in such a way as to avoid contact with the tip of the screw 11 within the through hole 4f. Also in this case, as described above, the holding plate 3 as well as the securing member 5 and the ground electrode of the imaging substrate 6 can be maintained at ground potential while being electrically independent of each other. This makes it possible to stabilize the ground potential of the ground electrode of the imaging substrate 6, and thereby acquire images of high resolution.

It is to be understood that the application of the invention is not limited to the specific embodiments described heretofore, and that various changes and modifications can be made without departing from the gist of the invention.

For example, as to the case of the camera module 10 thus far described, the lens 1 composed of three lenses is described. However, the lens 1 may be composed of either a single lens or two lenses. Further, the invention is applicable to the case where the lens 1 is composed of four or more lenses.

Moreover, although, in the case of the camera module 10 thus far described, the securing region 3a of the holding plate 3 is secured to the securing member 5 with the two screws 12, a unitary structure of the securing member 5 and the securing region 3a of the holding plate 3 may be used instead. In this construction, since the holding portion adjacent region 3b of the holding plate 3 is less prone to being changed in position, it follows that the holding portion adjacent region 3b of the holding plate 3 and the part around the through hole 4d of the holding portion 4c in the holder 4 become able to resist misalignment when overlapping each other.

Further, in order to achieve attachment of the securing region 3a of the holding plate 3 to the securing member 5, the tips of a plurality of the screws 11 inserted from the back side of the imaging substrate 6 may be left to protrude toward a subject rather than being retained in their respective screw holes 5a formed in the securing member 5. In this case, the through hole 3e of the holding plate 3 is so formed as to conform to the screw hole 5a of the securing member 5, and the tip of the screw 11 which protrudes toward a subject is passed through the through hole 3e and is then held securely by using a molten material such as solder, or a nut. In this construction, there is no need to use the two screws 12 required to attach the holding plate 3 to the securing member 5, with consequent reduction in the weight of the camera module 10.

EXAMPLES

The following imaging module pursuant to the invention was fabricated.

To begin with, there was prepared a rectangular imaging substrate 6 which was made of a glass cloth used as a base material and epoxy resin, was 20 mm in vertical dimension, 40 mm in horizontal dimension, and 1.6 mm in thickness, and had through holes 6a formed at the four corners thereof, respectively. Then, an imaging device 7 was mounted on one main surface of the imaging substrate 6 facing a subject, and a connector 13 and an IC were mounted on the other main surface, viz., the back-side main surface of the imaging substrate 6.

Next, by processing a resin material made of polyphthalamide, there was prepared a holder 4 including: a rectangular substrate securing portion 4a which had through holes 4f formed at the four corners thereof, respectively, and was 20 mm in vertical dimension, 40 mm in horizontal dimension, and 4.0 mm in thickness; a 15 mm-diameter lens support barrel 4b having a thread groove formed over the inner wall thereof; and a holding portion 4c comprising 3.5 mm-diameter through holes 4d.

Next, a stainless plate which was 20 mm in vertical dimension, 40 mm in horizontal dimension, and 1.5 mm in thickness was provided. At each of the four corners of the stainless plate is formed a through hole 5a, and then the stainless plate is cut away at its portions corresponding to the lens support barrel 4b and the holding portion 4c. In this way, a securing member 5 was prepared.

Next, a 0.1 mm-thick stainless plate was provided. The stainless plate was subjected to punching process in such a manner that its portions corresponding to a securing region 3a and a holding portion adjacent region 3b having 3.5 mm-diameter through holes 3c were left intact. After that, the stainless plate was folded at right angles along a line of boundary between the securing region 3a and the holding portion adjacent region 3b. In this way, a holding plate 3 was prepared.

Next, the imaging substrate 6, the holder 4, and the securing member 5 were arranged side by side in the order presented in a direction from the back side, and four screws 11 made of stainless were prepared for use. The tips of the screws 11 were inserted, from the back side, into their respective through holes 6a formed at the four Corners of the imaging substrate 6, were inserted into their respective through holes 4f formed at the four corners of the holder 4, and were put threadedly in their respective screw holes 5a formed at the four corners of the securing member 5. In this way, the substrate securing portion 4a of the holder 4 was sandwiched in between the imaging substrate 6 and the securing member 5 so as to be temporarily fixed in place.

Next, there was prepared a 13 mm-diameter lens barrel 2a having a thread groove formed over its outer periphery. A lens 1 composed of a group of three lenses was pressed, from the subject side, against a stepped portion formed on the inner wall in the inner space of the lens barrel 2a and was held securely by a retainer 2b. The lens barrel 2a was supportably inserted into the lens support barrel 4b, with the thread grooves engaging with each other.

Next, the holder 4 was moved relative to the imaging device 7 to position the lens 1 properly, and the screws 11 were re-tightened. Moreover, the lens barrel 2a was moved relative to the imaging device 7 to adjust the distance between the lens 1 and the imaging device 7. Then, the securing region 3a of the holding plate 3 was secured to the side of the securing member 5 facing a subject by using the screws 12, with the through hole 3c of the holding portion adjacent region 3b kept in proper alignment with the through hole 4d of the holding portion 4c. In this way, the camera module 10 was constructed by way of the imaging module of the invention. This camera module 10 had a mass of 19 g.

In addition, there was constructed an imaging module by way of a comparative example in which the holder 4 was made of aluminum but neither of the securing member 5 and the holding plate 3 was used. This imaging module had a mass of 24 g. In view of the foregoing, according to the imaging module of the invention, since the holder in use was made of resin, even if the securing member was used, the amount of metal materials to be used could be reduced. It has thus been confirmed that the imaging module can be made lighter in weight.

Moreover, the camera module 10 which was the imaging module of the invention was attached to a motor vehicle so as to be oriented to recognize white lines on a road ahead of the motor vehicle. Then, the motor vehicle has been driven to run for 30 days while taking images of the white lines on a road ahead of the motor vehicle as a subject. The result was that no change was observed as to the imaging direction and the resultant images were free from noise.

In view of the foregoing, according to the imaging module of the invention, the metal holding plate 3 is used, and the holding plate 3 comprises a securing region which is secured to and electrically connected to the securing member. Moreover, the holding portion adjacent region 3b, which overlaps the part around the through hole 4d of the holding portion in the holder 4, comprises the through hole 3c which communicates with the through hole 4d of the holding portion of the holder 4. In this construction, the holder can be retained in the external structure with stability simply by inserting a support pin or the like into the through hole 4d of the holding portion of the holder 4. Further, the metal securing member 5 affords the effect of shielding against electromagnetic wave noise from the subject side. It has thus been confirmed that the imaging module is capable of acquiring images of high resolution.

REFERENCE SIGNS LIST

1 Lens
1a First lens
1b Second lens
1c Third lens
2a Lens barrel
2b Retainer
3 Holding plate 3a Securing region
3b Holding portion adjacent region
4 Holder
4a Substrate securing portion
4b Lens support barrel
4c Holding portion
4d Through hole of holding portion
4e Projection
5 Securing member
6 Imaging substrate
7 Imaging device
10 Camera module (Imaging module)
11, 12 Screw

The invention claimed is:

1. An imaging module, comprising:
   an imaging substrate mounting an imaging device on one surface thereof, the imaging device being configured to convert subject light into an electric signal;
   a resin holder comprising:
     a substrate securing portion which covers the one surface of the imaging substrate and is configured to secure an outer periphery of the one surface,
     a lens support barrel which is formed integrally with the substrate securing portion, and is configured to support a lens for condensing the subject light into the imaging device at an inside thereof, and
     a holding portion which protrudes toward a subject from the substrate securing portion and comprises a through hole configured to permit retention of the resin holder in an external structure;
   a metal securing member which is disposed at a side of the substrate securing portion of the resin holder facing the subject, and is configured to sandwich the substrate securing portion with the imaging substrate; and
   a metal holding plate comprising:
     a securing region which is secured to the metal securing member and is electrically connected to the metal securing member, and
     a holding portion adjacent region which overlaps a part around the through hole of the holding portion of the resin holder and comprises another through hole configured to communicate with the through hole.

2. The imaging module according to claim 1, wherein a projection is formed near the through hole of the holding portion of the resin holder, and the projection is fitted into an opening formed near the another through hole of the holding portion adjacent region of the metal holding plate.

3. The imaging module according to claim 1, wherein
   the imaging substrate comprises a plurality of through holes, and a ground electrode attached to the other surface thereof, and
   wherein screws are inserted into the plurality of through holes from the other surface of the imaging substrate, respectively, wherein heads of the screws are kept in contact with the ground electrode, and tips of the screws are retained in screw holes formed in the metal securing member, respectively.

* * * * *